(No Model.) 3 Sheets—Sheet 1.
J. M. DODGE.
ELEVATING AND CONVEYING MECHANISM.
No. 534,097. Patented Feb. 12, 1895.
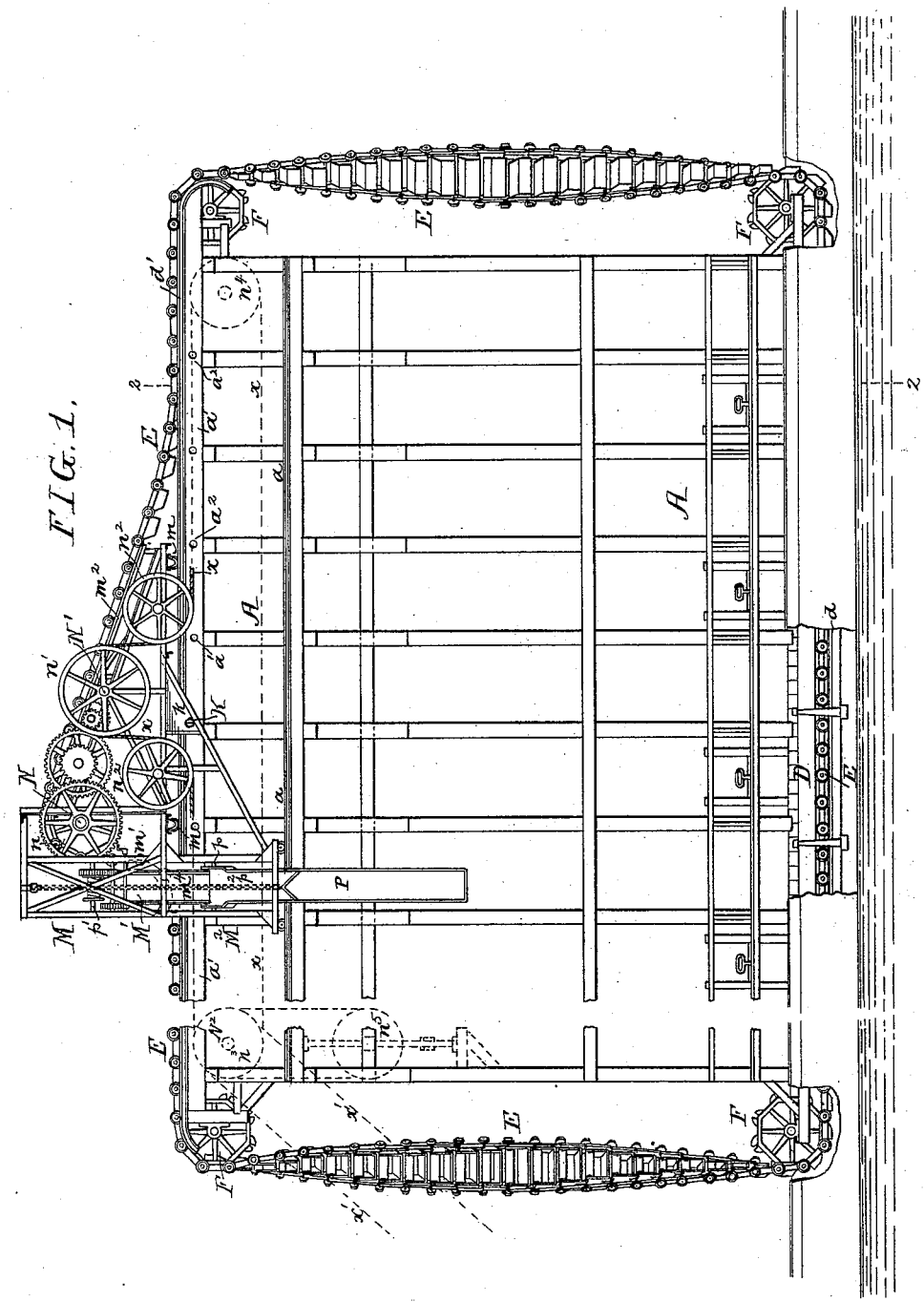

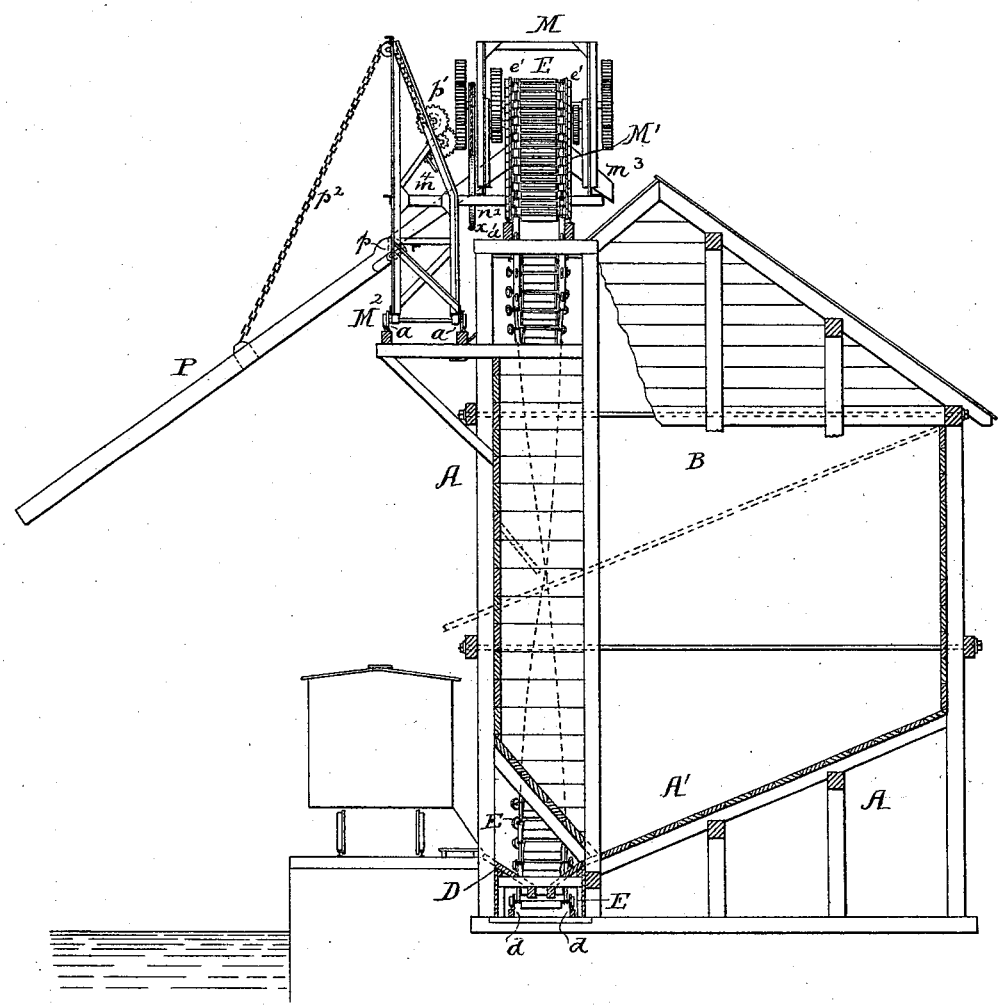

(No Model.) 3 Sheets—Sheet 3.
J. M. DODGE.
ELEVATING AND CONVEYING MECHANISM.
No. 534,097. Patented Feb. 12, 1895.
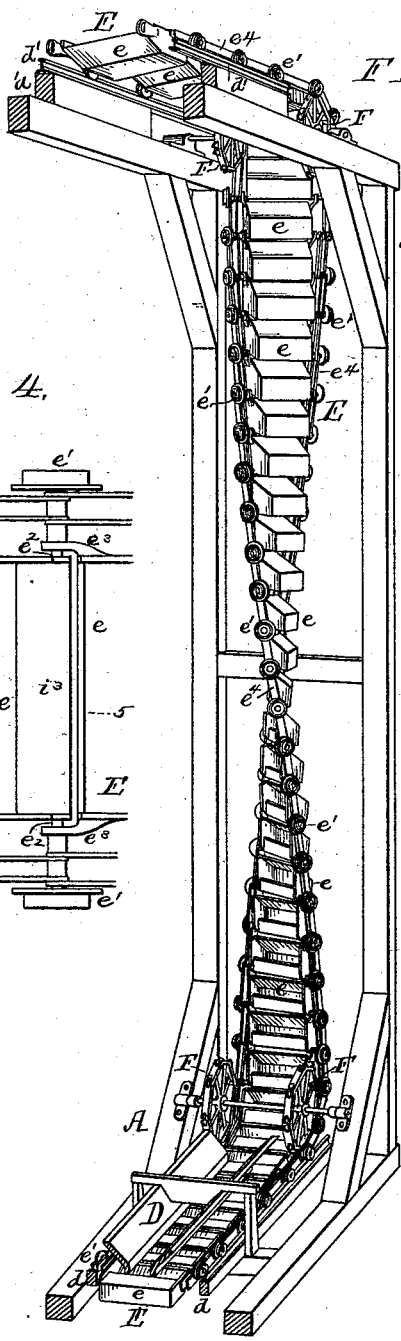
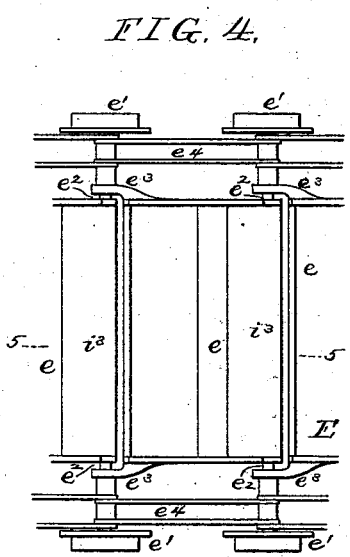
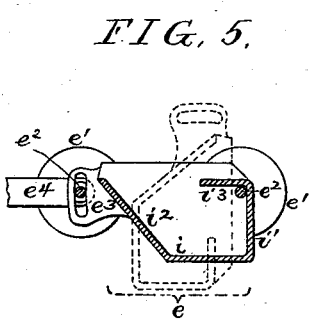
Witnesses:
R. Schleicher
William A. Barr
Inventor
James M. Dodge
by his Attorneys
Howson & Howson

UNITED STATES PATENT OFFICE.

JAMES M. DODGE, OF PHILADELPHIA, PENNSYLVANIA, ASSIGNOR TO THE LINK BELT ENGINEERING COMPANY, OF SAME PLACE.

ELEVATING AND CONVEYING MECHANISM.

SPECIFICATION forming part of Letters Patent No. 534,097, dated February 12, 1895.

Application filed September 25, 1893. Serial No. 486,360. (No model.)

*To all whom it may concern:*

Be it known that I, JAMES M. DODGE, a citizen of the United States, residing in Philadelphia, Pennsylvania, have invented certain Improvements in a Combined Elevating and Conveying Mechanism, of which the following is a specification.

The object of my invention is to so construct a continuous conveying apparatus that material can be carried by it without discharging, in a horizontal plane, a vertical plane and in another horizontal plane in a manner fully described hereinafter, and thus dispense with independent horizontal conveyers, and independent elevators.

My invention is especially applicable for use in buildings or large bins where it is wished to transfer material from the base of the bin or building up one end thereof and deliver it into bins in the upper portion of the building or into cars or boats.

Usually the transfer of material has been accomplished by the use of independent conveyers at the top and bottom, either using flights, buckets or pans, and an independent elevator at one end of the building or bin which receives material from the lower conveyer and discharges it into the upper conveyer. This method has been the most practicable, and the one in general use.

Another form is what is termed the swinging bucket conveyer, in which the buckets are pivoted at a point above their center so that they will always hang in a vertical position. This construction necessitates an intermittent loading and unloading of the buckets, and is not what is commonly known as a continuous conveyer, it being very slow in comparison with the continuous conveying method, and therefore not so acceptable.

I am enabled by my improvement to gain the advantages of a continuous conveyer with a single run and thus materially decrease the first cost of the apparatus, and also economize in the running expenses.

In the accompanying drawings:—Figure 1, is a side view of a storage bin and wharf illustrating my improved conveying mechanism. Fig. 2, is a section on the line 2—2, Fig. 1. Fig. 3, is a perspective view showing one end of the conveyer. Fig. 4, is a plan view showing two of the buckets; and Fig. 5, is a section on the line 5—5, Fig. 4.

A is the storage building situated in the present instance on a wharf and between the water and the building are suitable tracks for the railway cars.

In the building are storage bins A' and in the upper portion of the building may be arranged delivery bins B, shown by dotted lines in Fig. 2.

It will be understood that the construction of the building and bins may be modified. A simple framework may be used when the device is to be used only for loading cars or vessels.

Extending along the front of the building at the base is a trough D open at the bottom and directly under this trough are rails $d$, $d$ upon which travels the conveyer. In the present instance the trough D is open to the wharf and to the bins, so that material can be fed to the conveyer either from cars or boats or from the bins A'.

The conveyer E is constructed as follows:— $c$ is a series of buckets connected together by pivot rods $e^2$. Links $e^4$ connect the several rods together and are mounted on each side of the bucket, as clearly shown in Figs. 4 and 5. On the ends of the pivot rods are wheels $e'$ which traverse the track $d$ and $d'$. A pivot rod is mounted in one end of each bucket and the pivot rod of an adjoining bucket passes through slotted projections $e^3$ at the opposite end of the bucket, allowing sufficient play for the twisting movement of the conveyer. Thus the buckets have a fixed relation to the chain in counter-distinction to the ordinary pivoted buckets.

In the upper portion of the building are rails $d'$ on which travel the wheels $e'$ of the conveyer E, the conveyer passing around the wheels F at each corner of the building.

It will be noticed that the wheels of the conveyer traverse the horizontal rails $d$, $d'$, with the buckets in the position shown by full lines in Fig. 5, but when the chain passes from the lower run and travels upward the buckets are in the position shown by dotted lines in said figure, and in order to present the buckets in the same position on the top rails as they were on the bottom rails a half twist is given to the conveyer between the upper and lower runs, as shown fully in Fig. 3, thus turning the mouths of the buckets from the inside of the conveyer to the outside so that when the conveyer passes over the upper guide wheels the buckets will assume a position on the upper rails similar to that assumed by the buckets on the lower rails. Thus material can be carried from the lower run to the upper run without discharging and without using independent elevators or swinging buckets.

The buckets are made as shown in Fig. 5, having a bottom $i$, an upright end $i'$ and an inclined end $i^2$. Extending part way over the bucket is a cover $i^3$, which when the bucket is turned as shown by dotted lines in Fig. 5, holds the material in place.

When it is wished to discharge the buckets the position of each bucket is reversed with the inclined end down, thus allowing the material to freely flow therefrom.

The mechanism I use to discharge the material is constructed as follows:—M is a carriage having wheels $m$ adapted to traverse the track $d'$ and on this carriage is mounted a driving shaft N having sprocket wheels $n$ engaging with the chains of the conveyer. In the present instance this shaft N is the driving shaft for the conveyer, being geared to a shaft N' by a train of gears illustrated in Fig. 1, and on this shaft N' is a rope sheave $n'$ around which passes the rope $x$ which drives the mechanism, the rope passing around guide wheels $n^2$ mounted on the carriage and around rope sheaves $n^3$, $n^4$, at each end of the structure. The shaft $N^2$, upon which the sheave $n^3$ is mounted is driven in the present instance by a rope $x'$ extending to a motor. $n^5$ is the usual take-up used in connection with rope driving mechanism. The conveyer E passes around a guide $m'$ under the chute M' and up over the sprocket wheels $n$, thus turning the buckets so that their contents will readily flow into the chute M'. The conveyer then rests upon rails $m^2$ on the carriage M returning to the track $d'$. The chute is a double chute in the present instance having passages $m^3$, $m^4$, the passages $m^3$ directing the material to the bins, while the passages $m^4$ allow the material to flow to a car or boat. A valve in the upper portion of the chute directs the material either to one passage or the other. Connected to the carriage M is a carriage $M^2$ having wheels adapted to rails $a$, $a$, mounted on the framework of the building A so that it will travel with the carriage M. Pivoted at $p$ is a trough P, forming a continuation of the chute M. This trough can be raised or lowered by a windlass $p'$ to which it is connected by a chain $p^2$.

In the rail or stringer $a'$ forming part of the structure A are a series of openings $a^2$ and in the frame of the carriage M is an opening $k$ which aligns with any one of the openings $a^2$ according to the position of the carriage M, so that a pin K passed through the opening $k$ and into one of the openings $a^2$ in the frame will lock the carriage to the frame.

I utilize the same driving mechanism to move the carriage upon the rails as is used to drive the conveyer, and when the carriage is locked by the pin K or other locking mechanism to the frame A the driving mechanism will drive the conveyer, but when the pin K is removed the driving mechanism will operate to move the carriage using the conveyer as a rack, owing to the fact that it is much easier to move the carriage than to move the conveyer. When the carriage is moved to the position required it is again locked and motion will then be imparted to the conveyer.

While I have shown double links connecting the several pivot rods of the conveyer together single links may be used and in some instances wire or manilla rope or jointed rods may be substituted for the links and while I have shown the conveyer as free to twist in its upper run it may be guided by spiral guides, without departing from my invention.

In some instances it may be necessary to guide the conveyer in different planes and in a circuitous path, depending upon the construction of the apparatus and while I have used the terms "horizontal" and "vertical" runs it will be understood that the runs may be inclined, the object of my invention being to connect the upper and lower runs in such a manner that the buckets assume the same position on the upper run as they do on the lower run.

I claim as my invention—

1. The combination of a conveying apparatus, buckets thereon for the material, said buckets being fixed in relation to the chain, the conveyer being twisted between the upper and lower planes so that the buckets will assume the same position in the upper plane as they assume in the lower plane, substantially as described.

2. The combination in conveying apparatus, of the structure having bins, a trough open at the bottom, an endless conveyer passing around said structure and under the trough, fixed buckets on the conveyer, wheels over which the conveyer passes, said conveyer adapted to receive material on its lower run from the trough and deliver material from its upper run and twisted in its vertical run so that the pockets or buckets will assume the same position on the upper run as they do on the lower run, substantially as described.

In testimony whereof I have signed my name to this specification in the presence of two subscribing witnesses.

JAMES M. DODGE.

Witnesses:
WILLIAM A. BARR,
JOSEPH H. KLEIN.